United States Patent
Ojima et al.

(10) Patent No.: US 11,220,100 B2
(45) Date of Patent: Jan. 11, 2022

(54) CAN BODY MANUFACTURING SYSTEM

(71) Applicant: SHOWA ALUMINUM CAN CORPORATION, Tokyo (JP)

(72) Inventors: Shinichi Ojima, Tokyo (JP); Kazunori Ikeda, Tokyo (JP); Kazuhisa Masuda, Tokyo (JP); Hitomi Matsushima, Tokyo (JP)

(73) Assignee: SHOWA ALUMINUM CAN CORPORATION, Tokyo (JP)

( * ) Notice: Subject to any disclaimer, the term of this patent is extended or adjusted under 35 U.S.C. 154(b) by 0 days.

(21) Appl. No.: 17/261,575

(22) PCT Filed: Jun. 21, 2019

(86) PCT No.: PCT/JP2019/024649
§ 371 (c)(1),
(2) Date: Jan. 20, 2021

(87) PCT Pub. No.: WO2020/044746
PCT Pub. Date: Mar. 5, 2020

(65) Prior Publication Data
US 2021/0260868 A1     Aug. 26, 2021

(30) Foreign Application Priority Data
Aug. 27, 2018   (JP) .............................. JP2018-158535

(51) Int. Cl.
*B41F 17/14*     (2006.01)
(52) U.S. Cl.
CPC ..................................... *B41F 17/14* (2013.01)
(58) Field of Classification Search
CPC ........................................................ B41F 17/14
(Continued)

(56) References Cited

U.S. PATENT DOCUMENTS

| | | | | | |
|---|---|---|---|---|---|
| 3,563,170 | A | * | 2/1971 | Cvacho | B41F 17/22 |
| | | | | | 101/40 |
| 5,852,971 | A | * | 12/1998 | Yuyama | B41F 17/00 |
| | | | | | 101/35 |

(Continued)

FOREIGN PATENT DOCUMENTS

| JP | S338922 | 10/1958 |
|---|---|---|
| JP | 2005015173 | 1/2005 |

(Continued)

OTHER PUBLICATIONS

"International Search Report (Form PCT/ISA/210) of PCT/JP2019/024649," dated Sep. 3, 2019, with English translation thereof, pp. 1-4.

(Continued)

*Primary Examiner* — Anthony H Nguyen
(74) *Attorney, Agent, or Firm* — JCIPRNET

(57) ABSTRACT

While deterioration in processing efficiency caused by printing devices with slow printing speed is suppressed, facilities necessary to manufacture can bodies are able to be shared. A can body manufacturing system includes: a can body conveyance route, by which can bodies are conveyed, provided to branch halfway and thereafter merge again, the can body conveyance route at least including a first branching conveyance route and a second branching conveyance route; a first printing device performing printing on can bodies conveyed by the first branching conveyance route; and a second printing device performing printing on can bodies conveyed by the second branching conveyance route, the number of can bodies on which printing is performed by the second printing device per unit time being different from the number of can bodies on which printing is performed by the first printing device per unit time.

15 Claims, 6 Drawing Sheets

(58) Field of Classification Search
USPC .......................................................... 101/39
See application file for complete search history.

(56) References Cited

U.S. PATENT DOCUMENTS

| | | | |
|---|---|---|---|
| 9,862,204 B2 | 1/2018 | Izume | |
| 2005/0199143 A1* | 9/2005 | Steffen | B41F 17/16 |
| | | | 101/35 |
| 2006/0288888 A1* | 12/2006 | Wieland | B41F 7/16 |
| | | | 101/35 |
| 2012/0216689 A1* | 8/2012 | Cochran | B41F 33/0036 |
| | | | 101/39 |
| 2014/0028771 A1 | 1/2014 | Yamada et al. | |
| 2014/0049585 A1* | 2/2014 | Tashiro | B65D 23/0828 |
| | | | 347/102 |
| 2018/0207955 A1 | 7/2018 | Ojima et al. | |
| 2020/0009879 A1 | 1/2020 | Kimura et al. | |
| 2020/0122495 A1* | 4/2020 | Ojima | B41J 2/01 |

FOREIGN PATENT DOCUMENTS

| | | |
|---|---|---|
| JP | 2008183613 | 8/2008 |
| JP | 2012232771 | 11/2012 |
| JP | 2017029951 | 2/2017 |
| JP | 2018012320 | 1/2018 |
| WO | 2012147695 | 11/2012 |
| WO | 2017022402 | 2/2017 |
| WO | 2018008315 | 1/2018 |

OTHER PUBLICATIONS

"Search Report of Europe Counterpart Application", dated Oct. 13, 2021, pp. 1-13.

* cited by examiner

CAN BODY MANUFACTURING SYSTEM

CROSS-REFERENCE TO RELATED APPLICATION

This application is a 371 application of the international PCT application serial no. PCT/JP2019/024649, filed on Jun. 21, 2019, which claims the priority benefit of Japan application no. 2018-158535, filed on Aug. 27, 2018. The entirety of each of the abovementioned patent applications is hereby incorporated by reference herein and made a part of this specification.

TECHNICAL FIELD

The present invention relates to a can body manufacturing system.

BACKGROUND ART

Patent Document 1 discloses a process of printing plural brands on can bodies by use of plural printers, and thereafter, sorting the can bodies by each brand.

In Patent Document 2, there is disclosed a printing device, in which inkjet printing is performed in at least one inkjet printing station, and plural inkjet heads are arranged in the inkjet printing station.

CITATION LIST

Patent Literature

Patent Document 1: Japanese Patent Application Laid-Open Publication No. 2008-183613
Patent Document 2: Japanese Patent Application Laid-Open Publication No. 2012-232771

SUMMARY OF INVENTION

Technical Problem

When printing onto can bodies is to be performed by use of plural printing devices arranged in line along a single can body conveyance route and printed can bodies are to be successively conveyed along the can body conveyance route, if each of the printing devices has different printing speed, due to being affected by printing devices with slow printing speed, a whole processing efficiency is reduced.

In contrast thereto, conveyance of the can bodies performed individually in each of the printing devices by providing the can body conveyance path for each of the printing devices makes it possible to suppress deterioration of the whole processing efficiency, but, in this case, facilities cannot be shared.

The present invention, while suppressing deterioration in processing efficiency caused by printing devices with slow printing speed, makes it possible to share the facilities necessary to manufacture can bodies.

Solution to Problem

A can body manufacturing system to which the present invention is applied includes: a can body conveyance route conveying a can body provided to branch halfway and thereafter merge again, the can body conveyance route at least including a first branching conveyance route and a second branching conveyance route; a first printing device performing printing on a can body conveyed on the first branching conveyance route; and a second printing device performing printing on a can body conveyed on the second branching conveyance route, the number of can bodies on which printing is performed by the second printing device per unit time being different from the number of can bodies on which printing is performed by the first printing device per unit time.

Here, the can body manufacturing system is further provided with at least one of a can body storage part provided in the first branching conveyance route for temporarily storing can bodies on which printing by the first printing device has been performed and a can body storage part provided in the second branching conveyance route for temporarily storing can bodies on which printing by the second printing device has been performed.

Moreover, the can body manufacturing system is further provided with a discharge unit provided on an upstream side of the can body storage part in a can body conveyance direction to discharge a can body that does not satisfy a predetermined condition out of the branching conveyance route.

Moreover, the number of can bodies on which printing is performed by the second printing device per unit time is less than the number of can bodies on which printing is performed by the first printing device per unit time, and the second branching conveyance route is provided with a can body storage part temporarily storing can bodies on which printing by the second printing device has been performed.

Moreover, the can body manufacturing system is further provided with a discharge unit provided on an upstream side of the can body storage part in a conveyance direction of the can bodies conveyed by the second branching conveyance route and discharging a can body that does not satisfy a predetermined condition out of the second branching conveyance route.

Moreover, printing-processed can bodies, which are the can bodies on which printing by the first printing device has been performed, are conveyed to a downstream side and pass through a merging part of the first branching conveyance route and the second branching conveyance route, and the printing-processed can bodies are temporarily prevented from passing through the merging part, and thereafter, the can bodies on which printing by the second printing device has been performed are supplied to the merging part.

Moreover, the number of can bodies on which printing is performed by the second printing device per unit time is less than the number of can bodies on which printing is performed by the first printing device per unit time, and, in a branch portion where the can body conveyance route branches, a part passing through the branch portion and heading for the first branching conveyance route from an upstream side is linearly formed, and a part passing through the branch portion and heading for the second branching conveyance route from the upstream side is bent.

Moreover, printing-processed can bodies, which are the can bodies on which printing by the first printing device has been performed, are conveyed to a downstream side and pass through a merging part of the first branching conveyance route and the second branching conveyance route, and, every time a predetermined number of printing-processed can bodies pass through the merging part, the can bodies on which printing by the second printing device has been performed are supplied to the merging part from the second branching conveyance route.

Moreover, the number of can bodies heading for the second branching conveyance route from a branch portion, where the can body conveyance route branches, per unit time and the number of can bodies heading for the first branching conveyance route from the branch portion per unit time are different.

Moreover, the number of can bodies on which printing is performed by the second printing device per unit time is less than the number of can bodies on which printing is performed by the first printing device per unit time, and the number of can bodies heading for the second branching conveyance route from the branch portion per unit time is less than the number of can bodies heading for the first branching conveyance route from the branch portion per unit time.

Moreover, one of the first printing device and the second printing device is a printing device of a plate printing method and the other one is a printing device of an inkjet method.

Moreover, printing-processed can bodies, which are the can bodies on which printing by the first printing device has been performed, are conveyed to a downstream side and pass through a merging part of the first branching conveyance route and the second branching conveyance route, and the can body manufacturing system further includes a supply control unit controlling supply of the can bodies on which printing by the second printing device has been performed to the merging part.

Moreover, the supply control unit controls supply of the can bodies to the merging part by performing regulation on movement of the can bodies from the second branching conveyance route to the merging part, and by lifting the regulation.

Moreover, when the regulation is lifted, the supply control unit lifts the regulation for a predetermined time period.

Moreover, when the can bodies on which printing by the second printing device has been performed are supplied to the merging part, the supply control unit supplies a predetermined number of can bodies to the merging part.

Advantageous Effects of Invention

According to the present invention, it becomes possible, while suppressing deterioration in processing efficiency caused by printing devices with slow printing speed, to share the facilities necessary to manufacture can bodies.

DESCRIPTION OF EMBODIMENTS

Hereinafter, an exemplary embodiment according to the present invention will be described in detail with reference to attached drawings.

Figure 1:
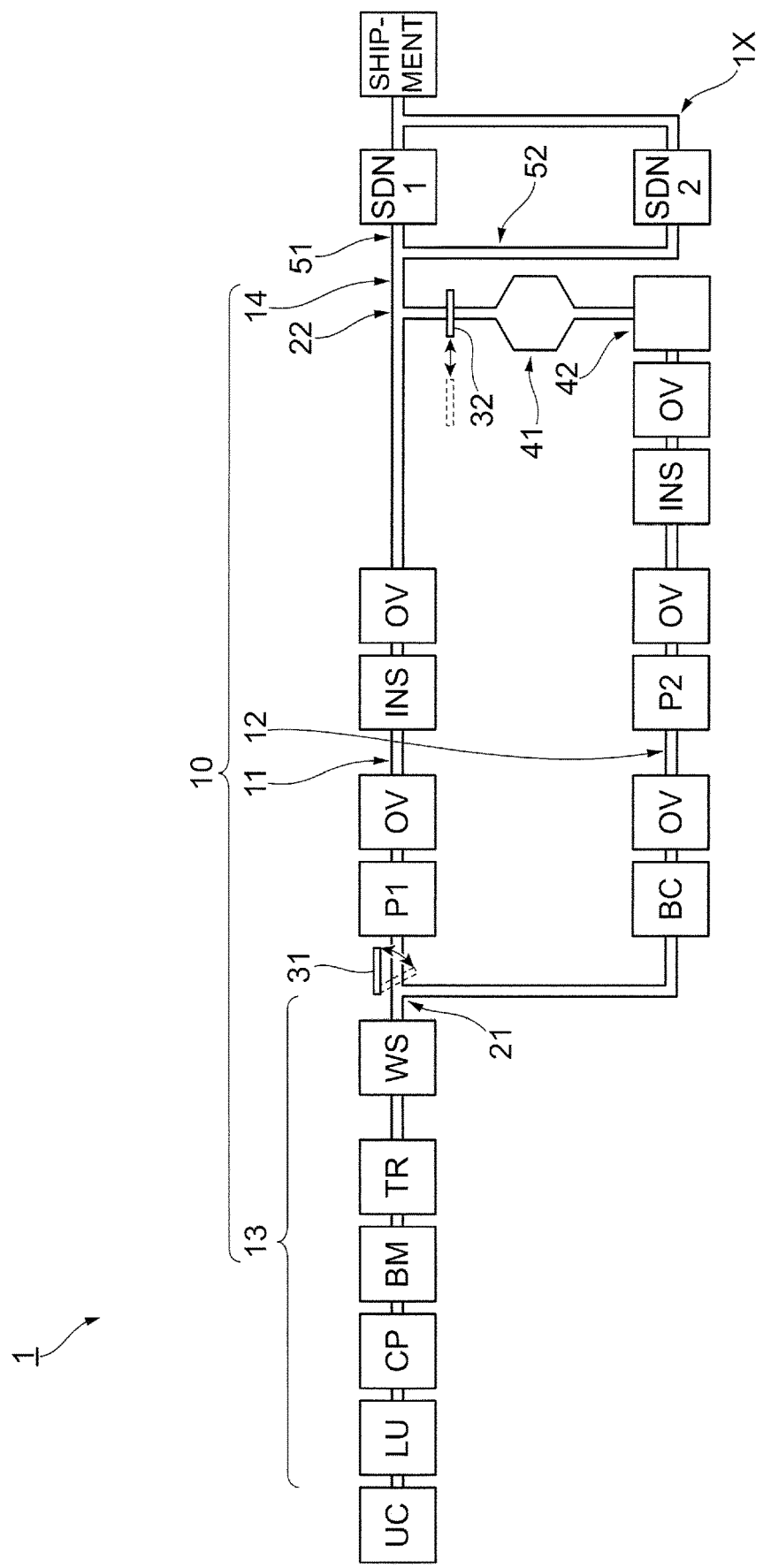
FIG. 1 is a diagram showing a can body manufacturing system.

FIG. 1 is a diagram showing a can body manufacturing system 1 related to the exemplary embodiment.

The can body manufacturing system 1 shown in FIG. 1 is a manufacturing process of a so-called two-piece can. Specifically, the can body manufacturing system 1 shown in FIG. 1 molds aluminum or an aluminum alloy by drawing and ironing (DI) molding, and thereafter, manufactures a can body 100 (not shown in FIG. 1) that is in a bottomed cylinder shape and made of metal.

Here, a beverage to be packaged into the can body 100 (the can for beverage) is not particularly limited, and the can body 100 is filled with, for example, an alcoholic beverage, such as beer or Chuhai, or a soft drink (a non-alcoholic beverage). Note that, after packaging, a lid member is attached to the can body 100, and thereby a beverage can filled with a beverage is completed.

Incidentally, in the following description, a can body 100 before being filled with beverage is referred to as a can for beverage, and a can body 100 after being filled with beverage is referred to as a beverage can in some cases.

As shown in FIG. 1, the can body manufacturing system 1 of the exemplary embodiment is provided with a can body conveyance route 10 on which the can bodies 100 are successively conveyed.

The can body conveyance route 10 is provided to branch along the way, and thereafter, merge again. The can body conveyance route 10 is provided with a first branching conveyance route 11 and a second branching conveyance route 12. More specifically, the can body conveyance route 10 branches at a branch portion 21, and the first branching conveyance route 11 and the second branching conveyance route 12 are provided on a downstream side of the branch portion 21.

Further, on a downstream side of the branch part 21, a merging part 22 where the first branching conveyance route 11 and the second branching conveyance route 12 merge with each other is provided. Further, on an upstream side of the branch portion 21, a pre-branch conveyance route 13 is provided, and, on the downstream side of the merging part 22, a post-merging conveyance route 14 is provided.

Moreover, at the branch portion 21, a first guidance member 31 guiding the can bodies 100 having been conveyed from the upstream side through the pre-branch conveyance route 13 to the second branching conveyance route 12 is provided.

In the case where the can bodies 100 having been conveyed from the upstream side through the pre-branch conveyance route 13 are to be guided to the second branching conveyance route 12, the first guidance member 31 is projected onto the can body conveyance route 10. Consequently, the can bodies 100 are guided to head for the second branching conveyance route 12.

Moreover, in the case where the can bodies 100 having been conveyed from the upstream side through the pre-branch conveyance route 13 are to be guided to the first branching conveyance route 11, the first guidance member 31 is retracted from the can body conveyance route 10. Consequently, the can bodies 100 head for the first branching conveyance route 11.

Moreover, the merging part 22 is provided with a regulation member 32 regulating movement of the can bodies 100. In the exemplary embodiment, in the case where the can bodies 100 are not supplied from the second branching conveyance route 12 to the merging part 22, the regulation member 32 is projected onto the second branching conveyance route 12. Consequently, supply of the can bodies 100 from the second branching conveyance route 12 to the merging part 22 is regulated.

Moreover, in the case where the can bodies 100 are supplied from the second branching conveyance route 12 to the merging part 22, the regulation member 32 is retracted from the second branching conveyance route 12. Consequently, the can bodies 100 are supplied from the second branching conveyance route 12 to the merging part 22.

Note that it may be possible to provide a regulation member (not shown) to be projected onto the first branching conveyance route 11 on the upstream side of the merging part 22, to thereby regulate movement of the can bodies 100 heading for the merging part 22 through the first branching conveyance route 11.

Further, in the exemplary embodiment, a first printing device P1 performing printing onto the can bodies 100 conveyed on the first branching conveyance route 11 is provided. In addition, a second printing device P2 performing printing onto the can bodies 100 conveyed on the second branching conveyance route 12 is provided.

Here, in the exemplary embodiment, the number of can bodies 100 on which printing can be performed per unit time is different between the first printing device P1 and the second printing device P2.

Specifically, in the exemplary embodiment, the number of can bodies 100 on which printing can be performed by the second printing device P2 per unit time is less than the number of can bodies 100 on which printing can be performed by the first printing device P1 per unit time.

More specifically, in the exemplary embodiment, the first printing device P1 is a printing device of a plate printing method and the second printing device P2 is a printing device of an inkjet method.

In general, the number of can bodies 100 on which printing can be performed by the printing device of the plate printing method per unit time is more than the number of can bodies 100 on which printing can be performed by the printing device of the inkjet method; with this, in the exemplary embodiment, the number of can bodies 100 on which printing can be performed by the second printing device P2 per unit time is less than the number of can bodies 100 on which printing can be performed by the first printing device P1 per unit time.

Here, the printing device of the plate printing method refers to a printing device performing printing by use of plates. More specifically, the printing device of the plate printing method refers to a printing device performing printing onto the can bodies 100 by attaching ink to plates and then transferring the ink adhered to the plates to the can bodies 100.

Note that the transfer may be performed by bringing the plates and the can bodies 100 into direct contact, or an intermediate transfer body may be disposed between the plates and the can bodies 100, to thereby perform the transfer onto the can bodies 100.

Here, examples of printing by the plate printing method include relief printing, intaglio printing, planographic printing and stencil printing, and any of these may be used in printing by the plate printing method. Note that, in the exemplary embodiment, the relief printing is used.

Moreover, the printing device of the inkjet method refers to a printing device performing printing by ejecting ink from inkjet heads to attach the ink to the can bodies 100.

In the printing device by the inkjet method, known methods can be used. Specifically, for example, a piezo system, a thermal (bubble) system, a continuous system or the like can be used.

Figure 2:
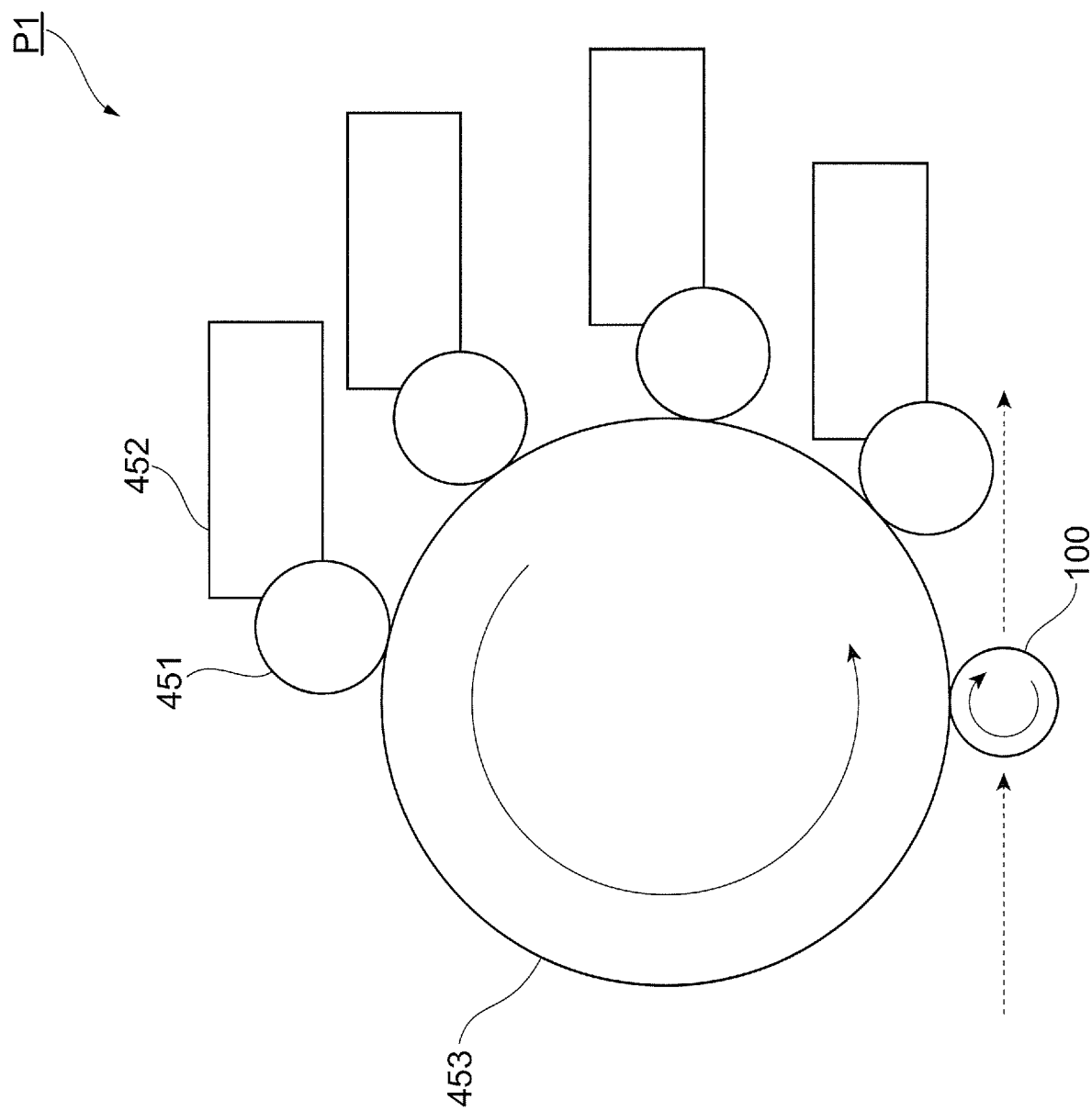
FIG. 2 is a diagram showing a first printing device.

FIG. 2 is a diagram showing the first printing device P1.

The first printing device P1, which is the printing device of the plate printing method, is provided with plural plate cylinders 451. On the surface of the plate cylinder 451, a plate including convex portions (not shown) corresponding to an image to be formed is provided. In addition, the first printing device P1 is provided with plural ink supply units 452 supplying ink to the convex portions of the plates on the surfaces of the plate cylinders 451.

Further, the first printing device P1 is provided with a blanket cylinder 453 including plural blankets (not shown) to which the ink from the plates on the surfaces of the plate cylinders 451 is transferred and which transfer the ink to the can bodies 100.

In the exemplary embodiment, the can body 100 moves to the first printing device P1 and stops at the first printing device P1. Further, the can body 100 rotates in the circumferential direction.

Moreover, in the first printing device P1, ink is supplied from the ink supply units 452 to the respective surfaces of the plates on the surfaces of the corresponding plate cylinders 451. Then, the ink adhered to the surfaces of the plates (the ink adhered to the convex portions of the plates on the surfaces of the plate cylinders 451) is transferred to the blankets on the surface of the blanket cylinder 453. Further, the ink transferred to the blankets is transferred to the rotating can body 100. Consequently, an image is formed on the outer circumferential surface of the can body 100.

Figure 3:
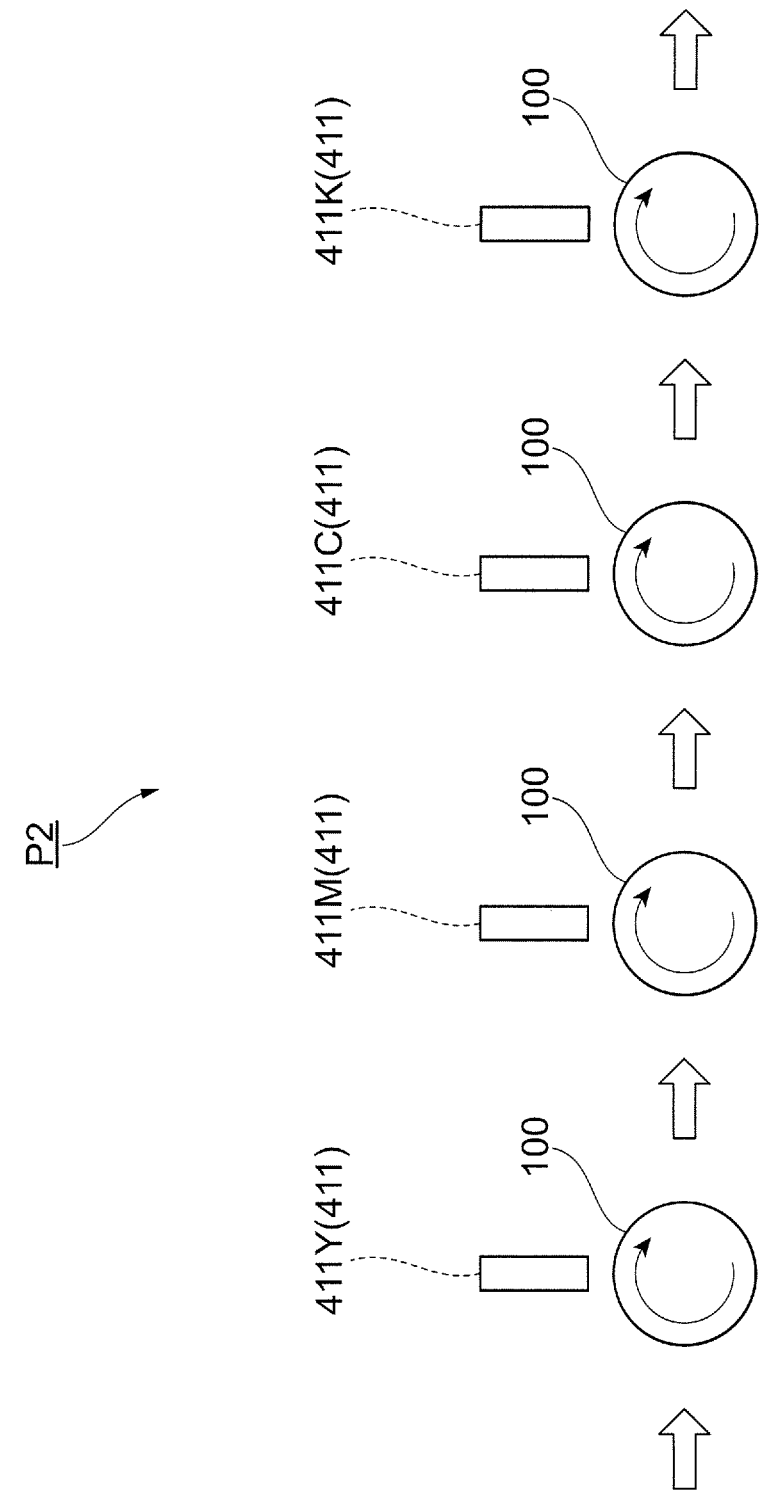
FIG. 3 is a diagram showing a second printing device.

FIG. 3 is a diagram showing the second printing device P2.

The second printing device P2 is provided with four inkjet heads 411.

Specifically, a first inkjet head 411Y ejecting yellow ink, a second inkjet head 411M ejecting magenta ink, a third inkjet head 411C ejecting cyan ink and a fourth inkjet head 411K ejecting black ink are provided.

The four inkjet heads 411 are disposed to extend in a direction orthogonal to the moving direction of the can body 100 (in a direction orthogonal to the page in the figure). Moreover, each of the four inkjet heads 411 is disposed to extend in the axial direction of the conveyed can body 100.

In addition, each of the four inkjet heads 411 is disposed above the conveyance route of the can body 100, to thereby eject ink toward the can body 100 positioned below.

In the exemplary embodiment, from each of the four inkjet heads 411, ink is ejected toward the can body 100 that is positioned below and rotating in the circumferential direction, and thereby an image is formed onto an outer circumferential surface of the can body 100.

Further, in the exemplary embodiment, as shown in FIG. 1, in the second branching conveyance route 12, a can body storage part 41 for temporarily storing the can bodies 100 on which printing by the second printing device P2 has been performed is provided.

In the can body storage part 41, the width of the second branching conveyance route 12 is larger than the upstream side; therefore, in the can body storage part 41, plural can bodies 100 can be arranged in the width direction of the second branching conveyance route 12. Consequently, in the can body storage part 41, more can bodies 100 are stored as compared to a configuration in which the width of the second branching conveyance route 12 is not changed.

Note that increase of the width like this is not essential, and the plural can bodies 100 may be stored by arranging the can bodies 100 in line along the second branching conveyance route 12.

Further, in the exemplary embodiment, in the conveyance direction of the can bodies 100 conveyed in the second branching conveyance route 12, a can body discharge part 42 as an example of a discharge unit is provided on the upstream side of the can body storage part 41.

In the can body discharge part 42, of the can bodies 100 on which printing has been performed by the second printing device P2, can bodies 100 that do not satisfy predetermined conditions (con bodies 100 in which defects are caused) are discharged out of the second branching conveyance route 12.

The exemplary embodiment has a configuration in which the can bodies 100 on which printing has been performed by the second printing device P2 are temporarily stored in the can body storage part 41. As in the exemplary embodiment, provision of the can body discharge part 42 discharges the can bodies 100 in which printing defects are caused, and thereby the rate of defective cans included in the can bodies 100 in the can body storage part 41 is reduced.

Since the capacity of the can body storage part 41 is limited, without discharging the defective cans, the can body storage part 41 is likely to be filled up. As in the exemplary embodiment, provision of the can body discharge part 42 practically increases the storage capacity of the can bodies 100 in the can body storage part 41.

Figure 4:
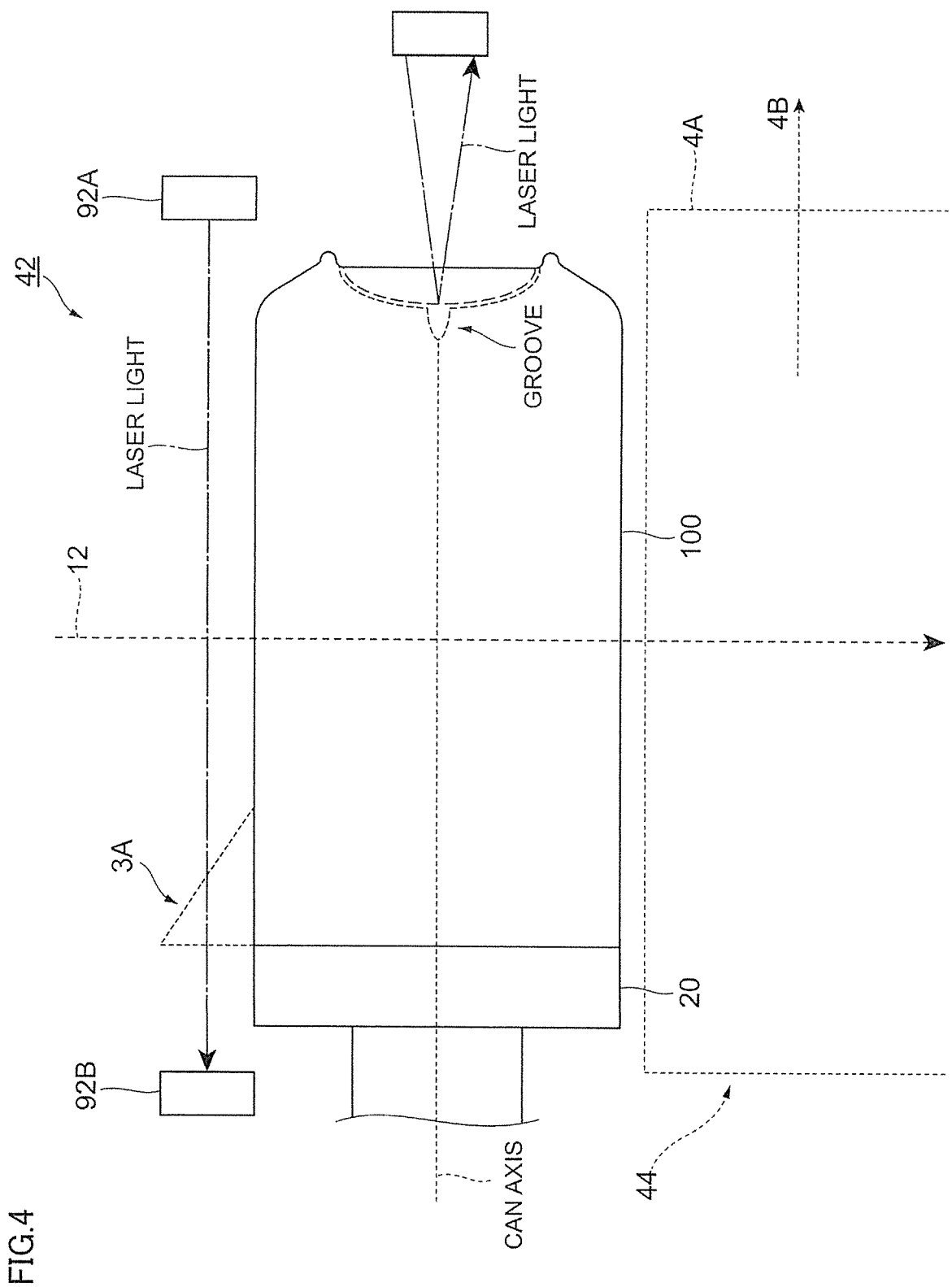
FIG. 4 is a diagram showing a configuration of a can body discharge unit.

FIG. 4 is a diagram showing a configuration of the can body discharge part 42.

The can body discharge part 42 is provided with a light source 92A. The light source 92A is provided on one end portion side of the can body 100 and the light source 92A emits laser light that proceeds in an axial direction of the can body 100 along the outer circumferential surface of the can body 100. Further, on the other end portion side of the can body 100, there is provided a light receiving part 92B that receives laser light from the light source 92A.

When a part of the can body 100 is deformed as indicated by the reference sign 3A, the laser light is cut off and the light receiving part 92B cannot receive the laser light. Consequently, deformation of the can body 100 is detected.

Then, in the exemplary embodiment, when it is determined in the can body discharge part 42 that the can body 100 does not satisfy predetermined conditions (when it is determined that the can body 100 is deformed), a discharge mechanism 44 discharges the can body 100 out of the second branching conveyance route 12.

After the can body 100 moved to a position indicated by a broken line 4A, the discharge mechanism 44 supplies compressed air to an inside of a cylindrically-formed can body support member 20. Consequently, the can body 100 moves in the axial direction (the direction indicated by the arrow 4B).

Further, the bottom portion (the closed end portion) of the moving can body 100 is sucked by a not-shown suction member. Then, by the suction member, the can body 100 is conveyed further and is discharged to the outside of the second branching conveyance route 12.

Note that, as a moving mechanism of the can bodies 100 in the can body manufacturing system 1 (refer to FIG. 1), for example, a belt moving mechanism using a belt that circularly moves can be used; in this case, the can bodies 100 are placed on the belt and moved.

Moreover, other than this, it may be possible to insert pins into the respective can bodies 100 and move the pins to thereby move the can bodies 100. In addition, the can bodies 100 may be moved by inserting the cylindrical can body support members 20 shown in FIG. 4 into the inside of the can bodies 100 and moving the can body support members 20.

Moreover, other than the above, for example, the can bodies 100 may be moved by use of a linear motor moving mechanism. Additionally, other than the above, for example, it may be possible to provide a configuration in which a driving source, such as a motor, is installed to a support body supporting the can bodies 100 and moving by itself, to thereby move the can bodies 100.

Figure 5:
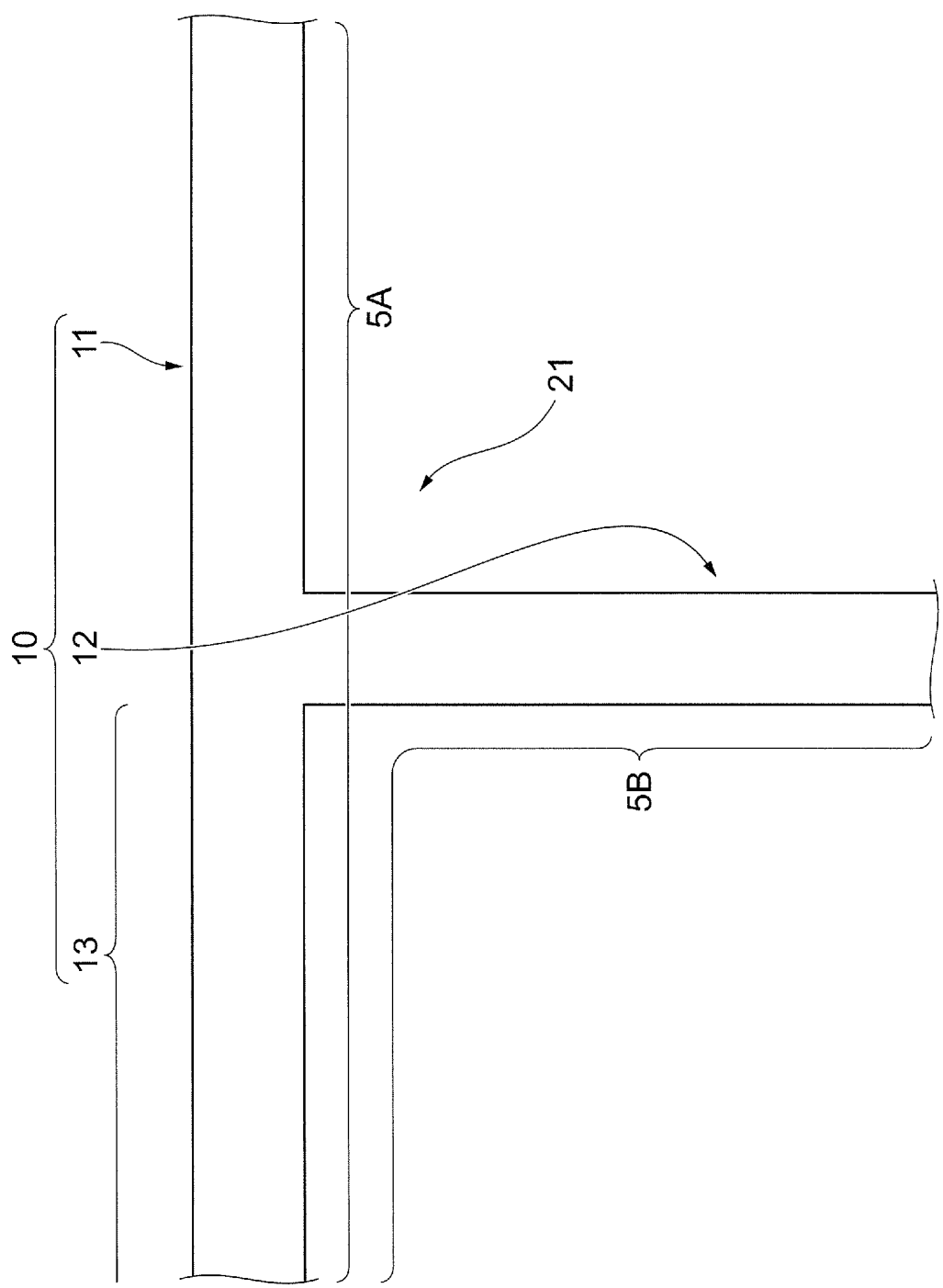
FIG. 5 is a diagram enlarging a branch portion.

FIG. 5 is a diagram enlarging a branch portion 21 shown in FIG. 1. Note that, in FIG. 5, illustration of the first guidance member 31 shown in FIG. 1 is omitted.

In the exemplary embodiment, a part passing through the branch portion 21 to head for the first branching conveyance route 11 from the upstream side is linearly formed. Specifically, a part reaching the upstream side of the first branching conveyance route 11 from the downstream side of the pre-branch conveyance route 13 (a part indicated by the reference sign 5A) is linearly formed.

On the other hand, a part passing through the branch portion 21 to head for the second branching conveyance route 12 from the downstream side of the pre-branch conveyance route 13 (a part indicated by the reference sign 5B) is bent. To put it another way, the part reaching the upstream side of the second branching conveyance route 12 from the downstream side of the pre-branch conveyance route 13 is formed in a bending state.

In the exemplary embodiment, as described above, the number of can bodies 100 on which printing can be performed by the second printing device P2 (refer to FIG. 1) per unit time is less than the number of can bodies 100 on which printing can be performed by the first printing device P1 per unit time.

With this, in the exemplary embodiment, the number of can bodies 100 heading for the second branching conveyance route 12 from the branch portion 21 per unit time is different from the number of can bodies 100 heading for the first branching conveyance route 11 from the branch portion 21 per unit time.

Specifically, the number of can bodies 100 heading for the second branching conveyance route 12 from the branch portion 21 per unit time is reduced as compared to the number of can bodies 100 heading for the first branching conveyance route 11 from the branch portion 21 per unit time.

In the exemplary embodiment, the number of can bodies 100 on which printing can be performed by the first printing device P1 per unit time is larger; therefore, it is necessary to supply more can bodies 100 to the first printing device P1 per unit time.

In this case, the linear part reaching the upstream side of the first branching conveyance route 11 from the downstream side of the pre-branch conveyance route 13 as in the exemplary embodiment makes it possible to move the can bodies 100 at a speed faster than the case in which the part is bent. Then, in this case, more can bodies 100 are able to be supplied to the first printing device P1 per unit time.

In contrast thereto, in the second printing device P2, the number of can bodies 100 on which printing is performed per unit time is small. In this case, even though the can body conveyance route 10 is bent and the conveyance speed of the can bodies 100 is reduced, it is possible to supply the required number of can bodies 100 to the second printing device P2.

Note that, in the exemplary embodiment, as shown in FIG. 5, the part heading for the first branching conveyance route 11 from the branch portion 21 and the part heading for the second branching conveyance route 12 from the branch portion 21 are in an orthogonal relationship; however, the layout of the first branching conveyance route 11 and the second branching conveyance route 12 is not limited thereto.

For example, the first branching conveyance route 11 and the second branching conveyance route 12 may be arranged so that the part heading for the first branching conveyance route 11 from the branch portion 21 and the part heading for the second branching conveyance route 12 from the branch portion 21 form a V shape.

In addition, in FIG. 5, the pre-branch conveyance route 13, the first branching conveyance route 11 and the second branching conveyance route 12 are shown in the same thickness (width), but each may have different width.

Next, a description will be given of supply of the can bodies 100 from the second branching conveyance route 12 (refer to FIG. 1) to the merging part 22.

In the exemplary embodiment, the can body 100 on which printing by the first printing device P1 has been performed (hereinafter, referred to as a "printing-processed can body 100") is conveyed to the downstream side and passes through the merging part 22 of the first branching conveyance route 11 and the second branching conveyance route 12. More specifically, in the case of the first branching conveyance route 11 of single-array conveyance (single conveyor), the printing-processed can bodies 100 pass through the merging part 22 in the state of being arranged in a row, whereas, in the case of multi-array conveyance (mass conveyor), the printing-processed can bodies 100 pass through the merging part 22 in the state of being arranged in multiple rows.

Then, in the exemplary embodiment, when the can bodies 100 are supplied to the merging part 22 from the second branching conveyance route 12, conveyance of the printing-processed can bodies 100 is temporarily suspended. To put it another way, the printing-processed can bodies 100 are temporarily prevented from passing through the merging part 22.

More specifically, for example, the printing-processed can bodies 100 are prevented from passing through the merging part 22 by temporarily suspending printing in the first printing device P1 or disposing the regulation member (not shown) regulating movement of the printing-processed can bodies 100 at the upstream side of the merging part 22.

Then, in the exemplary embodiment, the printing-processed can bodies 100 are prevented from passing through the merging part 22 as described above, and thereafter, the plural can bodies 100 on which printing by the second printing device P2 has been performed are supplied to the merging part 22.

In other words, in the exemplary embodiment, the can bodies 100 on which printing by the second printing device P2 has been performed are successively forwarded to the can body storage part 41, and the plural can bodies 100 are stored in the can body storage part 41.

Then, in the exemplary embodiment, for example, when the predetermined number of can body 100 are stored, the printing-processed can bodies 100 are prevented from passing through the merging part 22, and thereafter, the stored plural can bodies 100 are supplied to the merging part 22. To put it another way, the plural can bodies 100 are collectively supplied.

In the exemplary embodiment, it can be assumed that the can bodies 100 on which printing by the first printing device P1 has been performed and the can bodies 100 on which printing by the second printing device P2 has been performed are separately shipped.

In this case, supply of a single can body 100 on which printing by the second printing device P2 has been performed (hereinafter, referred to as a "second can body 100") to the merging part 22 every time printing by the second printing device P2 is performed on a single can body 100 causes a small number of second can bodies 100 to be included in a large number of printing-processed can bodies 100; in this case, it becomes difficult to carry out the above-described "separate" shipment.

In the configuration in which the plural second can bodies 100 are collectively supplied to the merging part 22 as in the exemplary embodiment, the can bodies 100 are likely to be sorted, and therefore, it becomes easy to separately ship the printing-processed can bodies 100 and the second can bodies 100.

Note that, other than the above, supply of the plural can bodies 100 on which printing by the second printing device P2 has been performed (the second can bodies 100) to the merging part 22 may be carried out by other modes.

For example, it may be possible to supply the second can bodies 100 on which printing by the second printing device P2 has been performed (the one or plural second can bodies 100) to the merging part 22 from the second branching conveyance route 12 every time a predetermined number (one or plural) of printing-processed can bodies 100 pass through the merging part 22.

Here, for example, when a commodity product packaging the plural can bodies 100 is to be produced, it is desired that the printing-processed can bodies 100 are mainly included and other can bodies 100 having different design are partially included in some cases. Moreover, in some situations, it is desired that the printing-processed can bodies 100 and the second can bodies 100 are alternately conveyed from the merging part 22 to the downstream side.

In such cases, as described above, the second can bodies 100 on which printing by the second printing device P2 has been performed (the one or plural second can bodies 100) are supplied to the merging part 22 from the second branching conveyance route 12 every time a predetermined number (one or plural) of printing-processed can bodies 100 pass through the merging part 22.

In this case, for example, while mainly including the printing-processed can bodies 100, it becomes possible to partially include the other can bodies 100 having different design. Moreover, in this case, for example, it becomes possible to alternately supply the printing-processed can bodies 100 and the second can bodies 100 from the merging part 22 to the downstream side.

Note that the image to be formed onto the second can body 100 by the second printing device P2 is not limited to a single pattern, but may be plural patterns.

In this case, it becomes possible to supply the second can bodies 100 of plural patterns each of which has a different image to the merging part 22. In this case, when it is desired that, while the printing-processed can bodies 100 are mainly included, the other can bodies 100 having a different design are partially included, it becomes possible to cause the other can bodies 100 to have a different design (brand).

Figure 6:
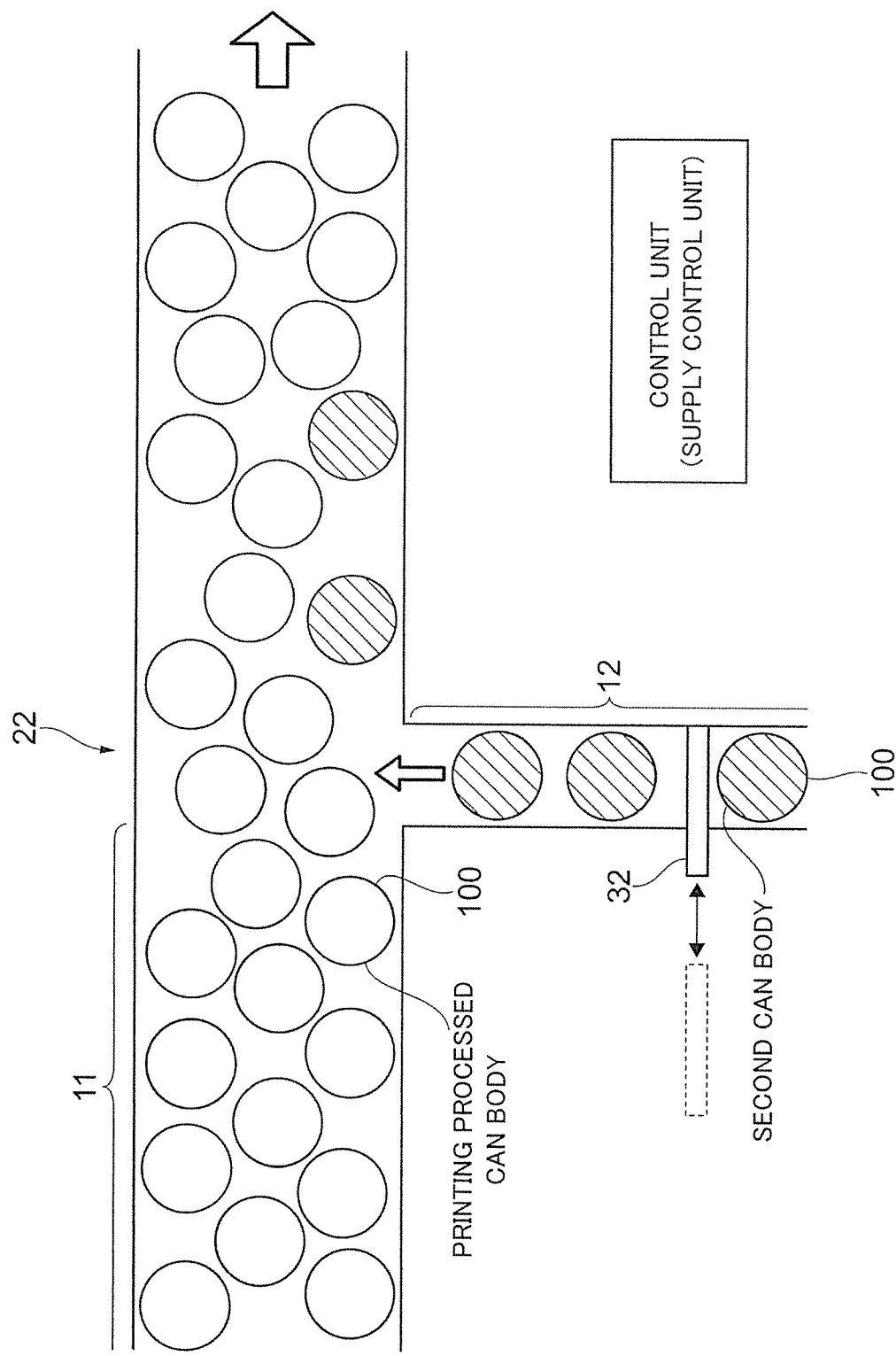
FIG. 6 is a diagram showing another conveyance mode of the can bodies in a merging part.

FIG. 6 is a diagram showing another conveyance pattern of the can bodies 100 in the merging part 22.

In the above description, when the second can bodies 100 were supplied to the merging part 22, the printing-processed can bodies 100 were prevented from passing through the merging part 22, and thereafter, the second can bodies 100 were supplied to the merging part 22.

In the conveyance mode shown in FIG. 6, the printing-processed can bodies 100 are continuously conveyed without suspending conveyance of the printing-processed can bodies 100. To additionally describe, the first branching conveyance route 11 is not provided with the regulation member in this example, and thereby the printing-processed can bodies 100 are continuously conveyed without suspending conveyance of the printing-processed can bodies 100.

Consequently, in the exemplary embodiment, the plural printing-processed can bodies 100 pass through the merging part 22. To additionally describe, in a state in which the printing-processed can bodies 100 are standing (in a state in which the axial direction of the cylindrical printing-processed can bodies 100 extends along the vertical direction), the plural printing-processed can bodies 100 pass through the merging part 22.

Further, in the conveyance mode, supply of the second can bodies 100 on which printing by the second printing device P2 has been performed to the merging part 22 is controlled. The supply control is performed by a not-shown control part (an example of a supply control unit).

The control part controls supply of the second can bodies 100 to the merging part 22 by performing regulation on movement of the second can bodies 100 from the second branching conveyance route 12 to the merging part 22 and by lifting the regulation.

Specifically, the control part performs regulation on the movement of the second can bodies 100 by projecting the regulation member 32 onto the second branching conveyance route 12, and lifts the regulation by retracting the projected regulation member 32 from the second branching conveyance route 12.

Here, when the above-described regulation is lifted, the control part lifts the regulation, for example, for a predetermined time (for example, 30 seconds). This supplies a predetermined number of second can bodies 100 to the merging part 22.

Moreover, when the above-described regulation is lifted, the control part lifts the regulation for a predetermined time (for example, 30 seconds) for example, every time a predetermined time has passed. This supplies a predetermined number (a plural number, such as one or four) of second can bodies 100 to the merging part 22 per unit time.

Moreover, other than the above, for example, when the second can bodies 100 are supplied to the merging part 22, the control part counts the number of second can bodies 100 to be supplied, and then supplies the second can bodies 100 to the merging part 22.

More specifically, for example, the control part detects the number of second can bodies 100 passing through the installation location of the regulation member 32 by use of a sensor or the like, and, when the number of second can bodies 100 passing through the installation location of the regulation member 32 reaches a predetermined number, projects the regulation member 32 onto the second branching conveyance route 12.

Moreover, other than the above, the timing of retracting the regulation member 32 and the time period of retracting the regulation member 32 may be randomly determined. In this case, the number of second can bodies 100 to be supplied to the merging part 22 is randomized.

Next, with reference to FIG. 1, configurations other than the first printing device P1 and the second printing device P2 will be described.

In the exemplary embodiment, the pre-branch conveyance route 13 is provided with, from an upstream side in the conveyance direction of the can bodies 100: an uncoiler (UC); a lubricator (LU); a cupping press (CP); a body maker (BM); a trimmer (TR); and a washer (WS) in this order.

In the uncoiler (UC), a thin aluminum plate wound around a coil is unwound. In the lubricator (LU), the thin aluminum plate is coated with lubricating oil. In the cupping press (CP), a circular-shaped blank is punched and is further subjected to drawing, to thereby mold a cup-shaped material.

In the body maker (BM) as an example of a molding process, the cup-shaped material is subjected to the drawing and ironing to make a peripheral wall have a predetermined thickness. Further, a bottom portion thereof is molded to have a dome shape. Consequently, a cylindrical can body 100 having an opening portion at one end and a bottom portion at the other end is molded.

In the trimmer (TR), an edge part at the upper portion of the peripheral wall of the can body 100 is trimmed. In the washer (WS), the can body 100 is washed to remove the lubricating oil or other adhered materials, and a chemical conversion coating treatment is performed as needed.

The first branching conveyance route 11 is, as described above, provided with the first printing device P1. Further, the first branching conveyance route 11 is provided with an oven (OV) on the downstream side of the first printing device P1. In the oven (OV), the can body 100 is heated and an image is baked onto the can body 100. Further, on the downstream side of the oven (OV), an inside spray (INS) and an oven (OV) are provided.

In the inside spray (INS), application (spraying) of paint onto the inner surface of the can body 100 is performed, to thereby carry out the inner surface painting. In the oven (OV), the can body 100 is heated and the paint is baked.

On the other hand, the second branching conveyance route 12 is provided with a base coater (BC). In the base coater (BC), colored paint is applied to the outer circumferential surface of the can body 100 to form an underlayer (a base coat layer). Note that, in the exemplary embodiment, white paint is applied to form the underlayer.

On the downstream side of the base coater (BC), an oven (OV) is provided, and, in the oven (OV), the can body 100 is heated and the underlayer is baked onto the can body 100.

Note that the base coater (BC) and the oven (OV) are not required depending on the brand thereof.

On the downstream side of the oven (OV), the second printing device P2 is provided, and the downstream side of the second printing device P2, an oven (OV) is provided. In the oven (OV) on the downstream side of the second printing device P2, the can body 100 is heated, and the image formed on the can body 100 by the second printing device P2 is baked onto the can body 100. Note that, in the case of using the ultraviolet cure ink, ultraviolet light irradiation may be performed.

On the downstream side of the oven (OV), an inside spray (INS) and an oven (OV) are provided.

In the inside spray (INS), application (spraying) of paint onto the inner surface of the can body 100 is performed, to thereby carry out the inner surface painting. In the oven (OV), the can body 100 is heated and the paint is baked.

A post-merging conveyance route 14 is provided with a necker flanger (SDN1) as an example of a diameter decreasing process. In the necker flanger (SDN1), an opening portion of the can body 100 is narrowed and a flange for attaching the can lid is molded.

Note that, as indicated by the reference sign 1x, it may be possible that the post-merging conveyance route 14 is branched on the downstream side of the merging part 22 to provide a third branching conveyance route 51 and a fourth branching conveyance route 52 on the downstream side of the merging part 22.

Then, in the configuration example, the fourth branching conveyance route 52 is provided with a second necker flanger (SDN2). In the second necker flanger SDN2, a so-called stepped neck is formed.

As described above, provision of the third branching conveyance route 51 and the fourth branching conveyance route 52 makes it possible to impart a different shape or a different function to a printed can body 100.

Note that each of these processes provided to the can body manufacturing system 1 is merely an example; it may be possible to delete part of the processes, add other processes, replace, or change positions thereof.

Here, as in the exemplary embodiment, in the case where the can bodies 100 on which printing has been performed are manufactured by performing printing on the can bodies 100 by use of the first printing device P1 and the second printing device P2, a mode in which the first printing device P1 and the second printing device P2 are arranged in line along a single can body conveyance route can be considered. In this case, while the can bodies 100 are sequentially conveyed along the single can body conveyance route, printing is performed on the can bodies 100 by plural printing devices.

Incidentally, in this case, the overall processing efficiency is deteriorated due to influence of the second printing device P2 with slow printing speed.

To deal with such an inconvenience, provision of the can body conveyance route for each printing device and individual performance in each printing device make it possible to suppress deterioration of the overall processing efficiency. However, facilities cannot be shared in this case.

In contrast thereto, in the configuration of the exemplary embodiment, while suppressing deterioration in processing efficiency caused by the second printing device P2 with slow printing speed, it is possible to share the facilities necessary to manufacture the can bodies 100.

Specifically, since the exemplary embodiment does not have the configuration in which the first printing device P1 and the second printing device P2 are provided on a single can body conveyance route, it is possible to suppress the above-described deterioration in processing efficiency caused by the second printing device P2 with slow printing speed.

Further, in the exemplary embodiment, each process (facility) positioned on the upstream side of the branch portion 21 and each process (facility) positioned on the downstream side of the merging part 22 can be used (shared) for manufacturing both of the above-described printing-processed can bodies 100 and second can bodies 100.

(Others)

In the above description, only the second branching conveyance route 12 (refer to FIG. 1) was provided with the can body storage part 41 and the can body discharge part 42; however, the can body storage part 41 and the can body discharge part 42 may be provided only to the first branching conveyance route 11 or both of the first branching conveyance route 11 and the second branching conveyance route 12.

In the case where the first branching conveyance route 11 is provided with the can body storage part 41 and the can body discharge part 42, the can body storage part 41 and the can body discharge part 42 are provided on the downstream side of the first printing device P1 and the upstream side of the merging part 22.

By the way, provision of the can body storage part 41 to the first branching conveyance route 11 makes it possible to continuously perform printing in the first printing device P1 even in the middle of supplying the can bodies 100 (the second can bodies 100) from the second branching conveyance route 12 to the merging part 22.

Here, if the can body storage part 41 is not provided to the first branching conveyance route 11, the first branching conveyance route 11 is filled with the printed can bodies 100 while the can bodies 100 are supplied from the second branching conveyance route 12 to the merging part 22; therefore, there is no other choice but to suspend printing in the first printing device P1. In contrast thereto, provision of the can body storage part 41 to the first branching conveyance route 11 makes it easier to avoid such suspension.

The invention claimed is:

1. A can body manufacturing system comprising:
    a can body conveyance route, by which can bodies are conveyed, provided to branch halfway and thereafter merge again, the can body conveyance route at least including a first branching conveyance route and a second branching conveyance route;
    a first printing device performing printing on can bodies conveyed by the first branching conveyance route; and
    a second printing device performing printing on can bodies conveyed by the second branching conveyance route, the number of can bodies on which printing is performed by the second printing device per unit time being different from the number of can bodies on which printing is performed by the first printing device per unit time.

2. The can body manufacturing system according to claim 1, further comprising:
    at least one of a can body storage part provided in the first branching conveyance route for temporarily storing can bodies on which printing by the first printing device has been performed and a can body storage part provided in the second branching conveyance route for temporarily storing can bodies on which printing by the second printing device has been performed.

3. The can body manufacturing system according to claim 2, further comprising:
    a discharge unit provided on an upstream side of the can body storage part in a can body conveyance direction to discharge a can body that does not satisfy a predetermined condition out of the first branching conveyance route and/or the second branching conveyance route.

4. The can body manufacturing system according to claim 1, wherein
    the number of can bodies on which printing is performed by the second printing device per unit time is less than the number of can bodies on which printing is performed by the first printing device per unit time, and
    the second branching conveyance route is provided with a can body storage part temporarily storing can bodies on which printing by the second printing device has been performed.

5. The can body manufacturing system according to claim 4, further comprising:
    a discharge unit provided on an upstream side of the can body storage part in a conveyance direction of the can bodies conveyed by the second branching conveyance route and discharging a can body that does not satisfy a predetermined condition out of the second branching conveyance route.

6. The can body manufacturing system according to claim 1, wherein
    a merging part where the first branching conveyance route and the second branching conveyance route merge is provided,
    printing-processed can bodies, which are the can bodies on which printing by the first printing device has been performed, are conveyed to a downstream side and pass through the merging part of the first branching conveyance route and the second branching conveyance route, and the printing-processed can bodies are temporarily prevented from passing through the merging part, and thereafter, the can bodies on which printing by the second printing device has been performed are supplied to the merging part.

7. The can body manufacturing system according to claim 1, wherein
a branch portion where the can body conveyance route branches to be the first branching conveyance route and the second branching conveyance route is provided,
a part passing through the branch portion and heading for the first branching conveyance route from an upstream side and a part passing through the branch portion and heading for the second branching conveyance route from the upstream side are provided,
the number of can bodies on which printing is performed by the second printing device per unit time is less than the number of can bodies on which printing is performed by the first printing device per unit time, and,
in the branch portion where the can body conveyance route branches, the part passing through the branch portion and heading for the first branching conveyance route from an upstream side is linearly formed, and the part passing through the branch portion and heading for the second branching conveyance route from the upstream side is bent.

8. The can body manufacturing system according to claim 1, wherein
a merging part where the first branching conveyance route and the second branching conveyance route merge is provided,
printing-processed can bodies, which are the can bodies on which printing by the first printing device has been performed, are conveyed to a downstream side and pass through the merging part of the first branching conveyance route and the second branching conveyance route, and,
every time a predetermined number of printing-processed can bodies pass through the merging part, the can bodies on which printing by the second printing device has been performed are supplied to the merging part from the second branching conveyance route.

9. The can body manufacturing system according to claim 1, wherein the number of can bodies heading for the second branching conveyance route from a branch portion, where the can body conveyance route branches, per unit time and the number of can bodies heading for the first branching conveyance route from the branch portion per unit time are different.

10. The can body manufacturing system according to claim 9, wherein
the number of can bodies on which printing is performed by the second printing device per unit time is less than the number of can bodies on which printing is performed by the first printing device per unit time, and
the number of can bodies heading for the second branching conveyance route from the branch portion per unit time is less than the number of can bodies heading for the first branching conveyance route from the branch portion per unit time.

11. The can body manufacturing system according to claim 1, wherein one of the first printing device and the second printing device is a printing device of a plate printing method and the other one is a printing device of an inkjet method.

12. The can body manufacturing system according to claim 1, wherein
a merging part where the first branching conveyance route and the second branching conveyance route merge is provided,
printing-processed can bodies, which are the can bodies on which printing by the first printing device has been performed, are conveyed to a downstream side and pass through the merging part of the first branching conveyance route and the second branching conveyance route, and
the can body manufacturing system further comprises a supply control unit controlling supply of the can bodies on which printing by the second printing device has been performed to the merging part.

13. The can body manufacturing system according to claim 12, wherein the supply control unit controls supply of the can bodies to the merging part by performing regulation on movement of the can bodies from the second branching conveyance route to the merging part, and by lifting the regulation.

14. The can body manufacturing system according to claim 13, wherein, when the regulation is lifted, the supply control unit lifts the regulation for a predetermined time period.

15. The can body manufacturing system according to claim 12, wherein, when the can bodies on which printing by the second printing device has been performed are supplied to the merging part, the supply control unit supplies a predetermined number of can bodies to the merging part.

* * * * *